United States Patent [19]

Dennys

[11] Patent Number: 5,183,273
[45] Date of Patent: Feb. 2, 1993

[54] SEALING GASKET FOR A CONTROL VALVE

[75] Inventor: Jean-Pierre Dennys, Maillot, France

[73] Assignee: Societe Industrielle D'Equipment Mecanique, France

[21] Appl. No.: 658,990

[22] Filed: Feb. 21, 1991

[30] Foreign Application Priority Data

Feb. 23, 1990 [FR] France .................. 9002245

[51] Int. Cl.$^5$ ............................................. F16J 15/24
[52] U.S. Cl. ...................................... 277/170; 277/115; 277/121; 277/118; 277/124; 277/125; 277/145; 277/190; 251/214; 251/364
[58] Field of Search ............... 277/170, 123, 124, 125, 277/190, 117, 118, 119, 120, 121, 143, 144, 145; 251/214, 364

[56] References Cited

U.S. PATENT DOCUMENTS

| | | | |
|---|---|---|---|
| 648,474 | 5/1900 | Ward | 277/121 |
| 1,214,303 | 1/1917 | Henderson | 277/144 |
| 1,216,521 | 2/1917 | Vivinus | 277/170 |
| 1,698,988 | 1/1929 | Bowman | 277/144 |
| 3,096,096 | 7/1963 | Banks | 277/117 |
| 3,188,048 | 6/1965 | Sutherland | 277/117 X |
| 3,307,572 | 3/1907 | Klapp et al. | 251/364 X |
| 3,479,063 | 11/1969 | Raver | 277/190 X |
| 3,586,341 | 6/1971 | Whittaker et al. | 277/124 |
| 3,871,667 | 3/1975 | Thompson | 251/214 X |
| 4,192,519 | 3/1980 | Buggele | 277/170 X |
| 4,256,317 | 3/1981 | Havens | 277/124 X |
| 4,305,567 | 12/1981 | Lunt | 251/214 |
| 4,327,923 | 5/1982 | Chesteron et al. | 277/123 X |
| 4,328,974 | 5/1982 | White et al. | 277/DIG. 6 |
| 4,394,023 | 7/1983 | Hinojosa | 277/124 |
| 4,462,568 | 7/1984 | Taylor et al. | 251/214 X |
| 4,475,713 | 10/1984 | Reed et al. | 251/214 |
| 4,558,874 | 12/1985 | Williams et al. | 251/214 X |
| 4,601,304 | 7/1986 | Schobl | 251/214 X |
| 4,826,181 | 5/1989 | Howard | 277/DIG. 6 |
| 4,892,320 | 1/1990 | Tückmantel | 277/DIG. 6 |

FOREIGN PATENT DOCUMENTS

| | | | |
|---|---|---|---|
| 961524 | 1/1975 | Canada | 277/190 |
| 834464 | 11/1938 | France | 277/144 |

Primary Examiner—William A. Cuchlinski, Jr.
Assistant Examiner—James K. Folker
Attorney, Agent, or Firm—Ostrolenk, Faber, Gerb & Soffen

[57] ABSTRACT

A sealing ring made up of nestable elements is constructed by forming a basic cylindrical-frustoconical element having the function of withstanding the height variations which are liable to be produced by a force exerted on the sealing ring in its axis of revolution. At least one of the nestable elements is formed of expanded graphite and compressed with a constant ratio. The elements are then fitted within each other until a sealing ring of predetermined height is obtained.

7 Claims, 1 Drawing Sheet

SEALING GASKET FOR A CONTROL VALVE

BACKGROUND OF THE INVENTION

1. Field of the Invention

The present invention relates to a method of construction of a sealing ring and to a product obtained in accordance with the method.

More particularly, the invention relates to a sealing ring which is suitable for use in fluidic circuits, especially those of thermal power plants.

2. Description of the Prior Art

In thermal power plants, the dimensions of the various equipment units such as control valves and the steam pressures within these units have now reached values such that, in the case of large diameters and high pressures, equipment manufacturers have replaced the conventional assembly of bolted external coupling flanges by a built-in system.

For example in the case of a valve equipped with a plug and an operating stem which passes through the plug, it is necessary to provide a sealing system within the closed space delimited by an inclined portion of one plug face, the internal wall of the valve body and a single-piece ring which is held by a detachable upper ring fitted within an annular groove of the valve body. As a rule, the inclined portion of the plug whose bottom and top faces are subjected to the pressure of circulating fluid and to the external pressure respectively is inclined to the vertical axis of the plug at an angle of 25°.

The sealing system which was still in use a short time ago consisted of a metal ring of suitable shape which was placed within the above-mentioned closed space and had a lower portion or lip which was capable of undergoing deformation at the time of displacement of the plug produced by the pressure rise within the body of the device. The deformation of the lip was sufficient to ensure leak-tightness. However, when leakage occurred prior to deformation of the lip, erosion of the valve body and/or of the plug was liable to occur, thus inevitably giving rise to deficient leak-tightness.

Moreover, at the time of removal of the plug, the forces which have been generated by the hydrostatic pressure exerted on the internal surface of the plug and which have been entirely transmitted to the lip of the ring have deformed the lip to a degree such that the force exerted on the plug towards the interior of the device during the operations involved in disassembly in order to release the different rings is liable to cause eccentric displacement of the plug and jamming against the body of the device. This would entail the need to heat or to saw the body in order to cause it to expand, that is to say to cause partial destruction of a device having walls which were intended to afford resistance to high pressures.

In order to overcome these disadvantages, it has recently been proposed to replace the metal rings by recompressed rings of expanded graphite.

However, sealing rings of this type having a base of graphite of variable thickness have proved suitable for use on the one hand only in small volumes or closed spaces to be filled and on the other hand in devices in which the fluid is substantially stable in pressure and in temperature. The reason for this is that, in the case of large spaces to be filled, it is not possible to gain complete mastery over the technique of manufacture of an expanded graphite ring of variable thickness which performs the double function of resistance to pressure and leak-tightness.

In fact, during compression of the graphite, the dimensions vary considerably in the direction of compression and the paths of the graphite particles remain very close to straight lines parallel to the cylindrical walls. In consequence, the lowest degrees of densification will correspond to the largest dimensions in the direction of compression.

The aim of the present invention is to produce a sealing ring which has a base of expanded graphite and which has good characteristics of pressure resistance and leak-tightness.

SUMMARY OF THE INVENTION

The present invention is directed to a method of construction of a sealing ring made up of at least two elements, namely one element which serves as a support having the intended function of accommodating the variations in height which are liable to take place in the direction of compression and another element which is intended to ensure leak-tightness proper by undergoing deformation to a sufficient extent to constitute an obstacle to the flow of fluid.

The element which ensures leak-tightness is supported mechanically by the other element and has an internal wall which is substantially parallel to the external wall but is relatively displaced in the direction of compression. By means of this arrangement, the sealing element can readily be constructed from a starting element by axial compression, the height of the starting element being reduced in a ratio of 2 to 1, 3 to 1 or an intermediate ratio, thus making it possible to obtain the necessary compactness to form a barrier to the fluid in the external zone which corresponds to the flow of fluid at the periphery of the plug.

Another object of the present invention is to provide a sealing ring obtained in accordance with the method outlined in the foregoing.

DETAILED DESCRIPTION OF THE INVENTION

Figure 1:
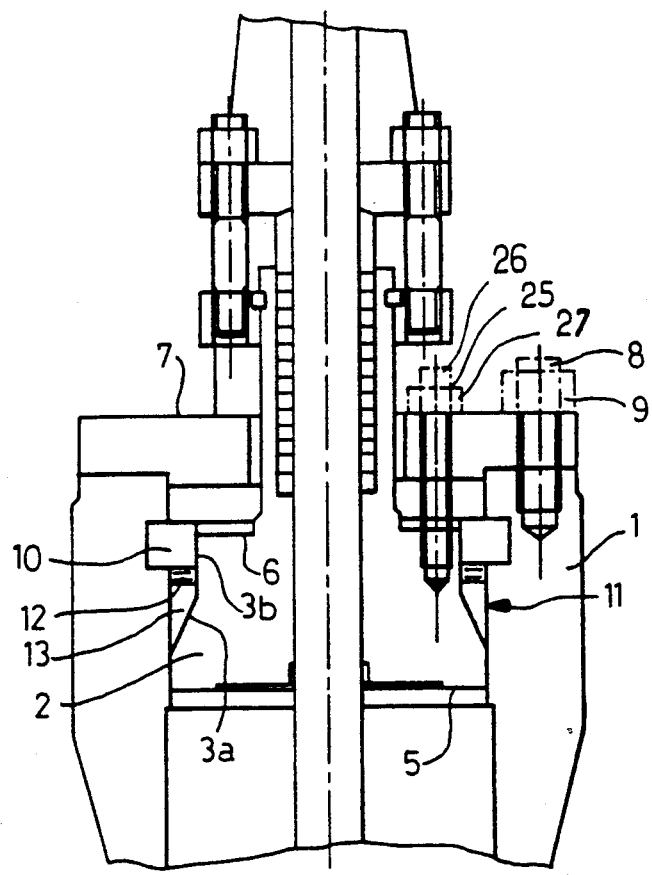
FIG. 1 is a sectional view of that part of a control valve which is equipped with a sealing ring in accordance with the present invention.

A control valve of the plug type as shown partially in FIG. 1 has a cylindrical body 1 in which is placed a plug 2, the external lateral wall of which has an inclined portion 3a and vertical portions 3b so as to be capable of displacement within said cylindrical body 1. The bottom face 5 of the plug 2 is subjected to a high pressure produced by the fluid which flows within the valve whilst the top face 6 is subjected to the external pressure. The valve is closed by a top flange 7 which is fixed on the cylindrical body by means of studs 8 and nuts 9. A segment ring 10 is embedded in the internal wall 11 of the cylindrical body and serves as a support for a ring 12 which in turn serves as a support for a sealing ring 13. As far as it is possible to do so, the sealing ring must fill the closed space delimited by the internal wall 11, the bearing ring 12 and the external lateral wall 3 of the plug 2.

Figure 2:
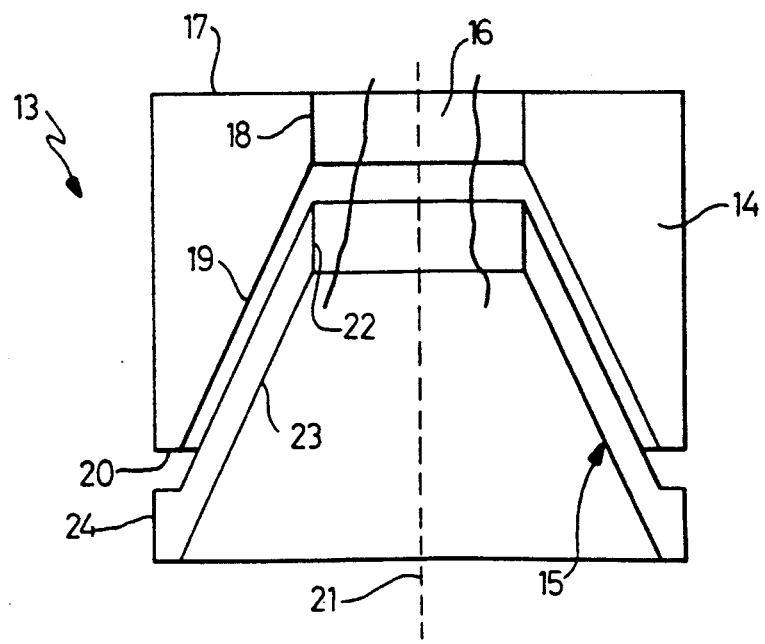
FIG. 2 is an enlarged sectional view of the sealing ring.

In accordance with the present invention, the sealing ring is constructed in the form of at least two separate elements 14, 15 which are capable of nesting one within the other (as shown in FIG. 2).

The element 14 is for example of expanded graphite which has been subjected to a sufficient force to cause the inner layers which are the first to be compacted to exert a radial thrust on the adjacent outer layers until a bottom zone is obtained on the outer layers and the internal pressure exerted on said bottom zone is approximately double the pressure of the fluid which flows within the valve. The element 14 is compressed with variable ratios under a pressure within the range of 200 to 1500 bar and preferably at least 500 bar in order to make maximum use of the fact that graphite has the property of behaving as a fluid under high pressures. In consequence, expanded graphite which is compressed to more than 500 bar has sufficiently high strength to constitute a stable support for the element 15 as well as to transmit the internal stresses and corresponding displacements in a practically homogeneous manner and in all directions.

The element 14 is compressed so as to give it the shape of a cylindrical-frustoconical ring. The drawing of FIG. 2 is not to scale since the central orifice 16 can have much larger dimensions than the annular bearing zone 17. The cylindrical portion 18 has a height which cannot be less than 0.5 mm. Preferably, the cylindrical portion 18 has a height within the range of 6 to 15 mm and essentially depends on the external dimensions which in turn depend on the pressures developed within the valve. The frustoconical portion 19 has an angle of slope which is practically equal to that of the frustoconical portion of the plug which is located opposite. In the example shown, the angle of slope is approximately 25° in order to permit correct application of the plug against the sealing ring in accordance with the invention. A flat underface 20 having a width of approximately 1 mm is formed on the bottom edge of the element 14.

The element 14 thus formed occupies the greater part of the closed space to be filled as defined earlier and is sufficiently rigid to accommodate all variations in height produced in the axis of revolution 21 of the ring. This requirement is all the more important since the pressures transmitted by the plug to the element 14 via the element 15 are within the range of 3 to 6.5 times the pressure of the fluid which flows through the valve owing to the cross-sections which are present.

The element 15 has a shape corresponding to that of the element 14 in order to ensure that it can be fitted within the second peripheral zone with practically zero clearance. The element 15 has a cylindrical portion 22 of substantially the same height as the cylindrical portion 18, said portions 18 and 22 being in alignment with each other after interengagement of the elements 14 and 15. The frustoconical portion 23 of the element 15 is inclined in the same manner as the portion 19 of the element 14 and terminates in an annular rim 24, the height of which is equal to that of the portion 22 and the width of which is equal to the width of the flat underface 20 of the element 14.

When the elements 14 and 15 are nested one within the other, they virtually form a single-piece ring without any geometrical discontinuity between them other than their difference in compactness, the element 15 being intended to stop the fluid which tends to flow upwards between the periphery of the plug 5 and the bore 11 and which must be contained as close to this passage as possible.

The element 15 is of relatively small thickness and obtained from a strip of coiled expanded graphite. Said element is precompressed for positioning with a constant ratio and under a force of preferably lower value than the force to which it is subsequently subjected by the plug under the pressure of the fluid once this element is in position, with a view to ensuring that the graphite particles readily migrate into the small spaces available and achieve the requisite degree of leak-tightness. The element 15 is compressed with a constant ratio under a pressure within the range of 100 to 500 bar and usually under a pressure in the vicinity of twice the pressure of the fluid to be sealed-off.

It is readily apparent that the sealing ring in accordance with the invention can be made up of more than two nestable elements. However, whenever the sealing ring is intended to have more than two elements, there will be a basic element similar to the element 14. The other elements are similar to the element 15 and have physical characteristics substantially equal to each other. Thus, each element 15 will be provided with an annular rim having a height equal to the internal cylindrical portion 22 and a width equal to the flat underface 20 of the basic element 14.

When the sealing ring in accordance with the invention is fitted within its housing in the valve (as shown in FIG. 1) and prior to putting the valve in service, the initial operation consists in precompressing the sealing ring by means of mechanical clamping members 25 consisting of a threaded stud 26 and a nut 27, the threaded stud 26 being intended to connect the plug 2 to the general supporting flange 7. The force exerted by the clamping members is sufficient to establish leak-tightness by ensuring intimate contact on the one hand between the plug 2 and the sealing ring and on the other hand between the ring and the internal wall of the body 1, to apply the various nested elements 14 and 15 against each other and to initiate deformation of the sealing ring in all directions so as to ensure that the sealing ring housing is practically completely filled. When the valve is put into service, the fluid cannot penetrate behind the ring or flow along the internal wall of the valve body since the pressures developed within the valve increase the deformation of the sealing ring. Should the need arise, it would also be possible to place a gasket of suitable shape and of asbestos, for example, on the lowermost element of the sealing ring.

It is readily apparent that, at the time of disassembly, the sealing ring in accordance with the invention can be recovered without any great effort in one or a number of pieces. In all cases, recovery of the sealing ring does not present any difficulty and is not liable to result in any damage either to the internal wall of the valve body or to the plug itself. Similarly, there is no danger of jamming of the ring within its housing since it will always be possible to extract it in pieces.

As will be clearly understood, the invention is not limited in any sense to the embodiment which has been described with reference to the accompanying drawings. Depending on the applications which may be contemplated, many alternative embodiments within the capacity of those versed in the art may accordingly be considered without thereby departing either from the scope or the spirit of the invention.

What is claimed is:

1. A sealing gasket for a control valve, said control valve having a body with an internal wall, a plug being disposed within the body of said control valve, said plug being movable in an axial direction within said control valve body on an operating stem passing therethrough, said plug having a bottom surface which is subjected to high pressure produced by fluid which flows within said control valve and urges said plug to move upwards;

said plug having an external lateral wall comprising a first upper portion which contacts said internal wall of said control valve body and a second lower inclined portion which is inclined away from said internal wall of said control valve body to define a space between said internal wall and said plug;

said gasket being disposed in said space, said gasket comprising two parts, a rigid upper part and a deformable lower part nested together, said deformable part being disposed below said rigid part and having an inner inclined surface which contacts said lower include portion of said plug, so that, during said upward movement of said plug, all of said inner inclined surface of said deformable part is subjected to force from said plug causing said deformable part to compress and to seal said space in said control valve.

2. A sealing gasket as recited in claim 1, wherein said right part is formed of expanded graphite.

3. A sealing gasket as recited in claim 1, wherein said deformable part is formed of compressed graphite.

4. A sealing gasket as recited in claim 1, wherein said deformable part has a cylindrical-conical shape.

5. A sealing gasket as recited in claim 4, wherein the cylindrical portion of said deformable part has a height of approximately 3 mm.

6. A sealing gasket as recited in claim 3, wherein said deformable part has an annular rim, the length of which is equal to the height of the cylindrical portion of said deformable part.

7. A sealing gasket as recited in claim 6, wherein said right part has a flat underface which coacts with said annular rim of said deformable part.

* * * * *